Patented May 29, 1934

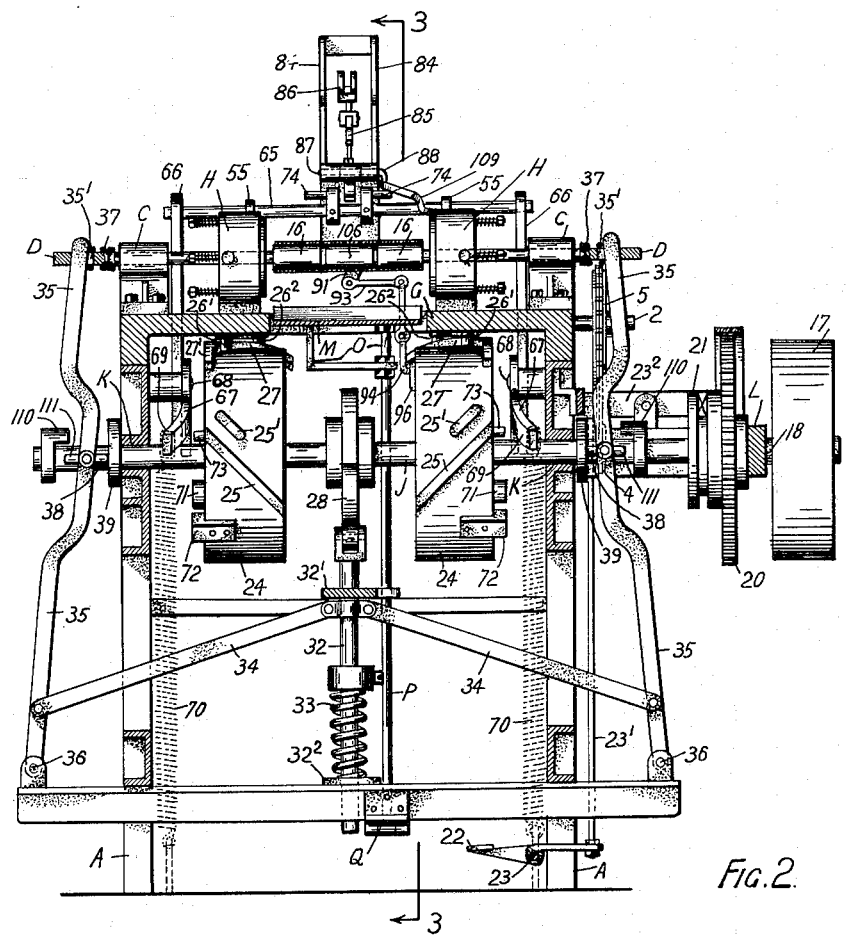
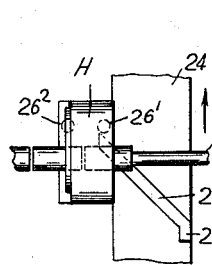 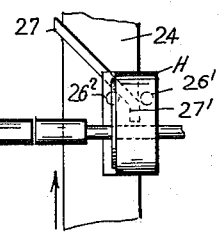 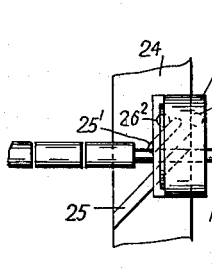 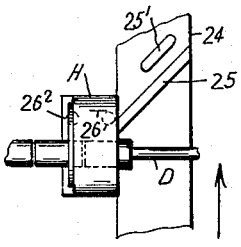
Fig. 2.
Fig. 4.A    Fig. 4.B    Fig. 4.C    Fig. 4.D May 29, 1934.　　　　F. R. STELLING　　　　1,960,759
MACHINE FOR THE MANUFACTURE OF CHRISTMAS CRACKERS
Filed April 28, 1933　　　5 Sheets-Sheet 4
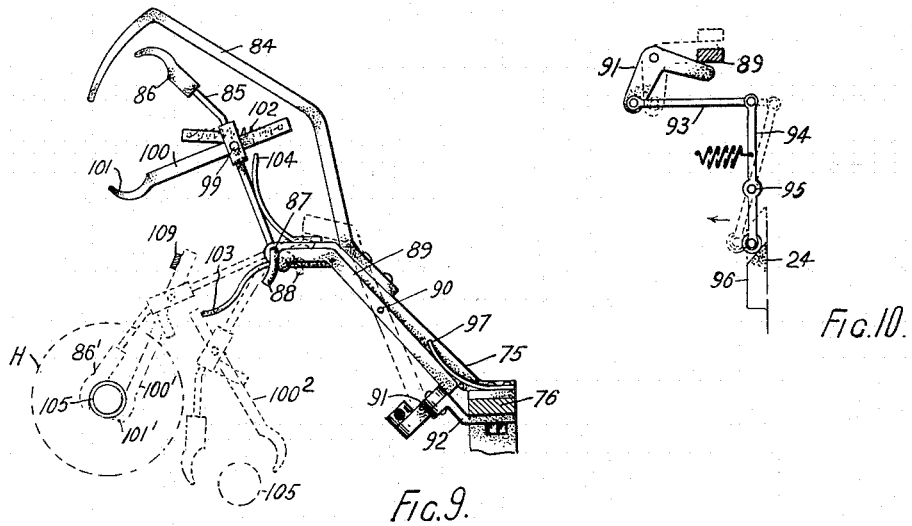
Fig.9.
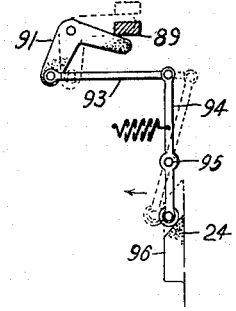
Fig.10.
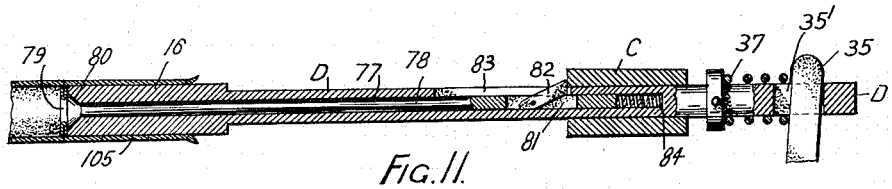
Fig.11.
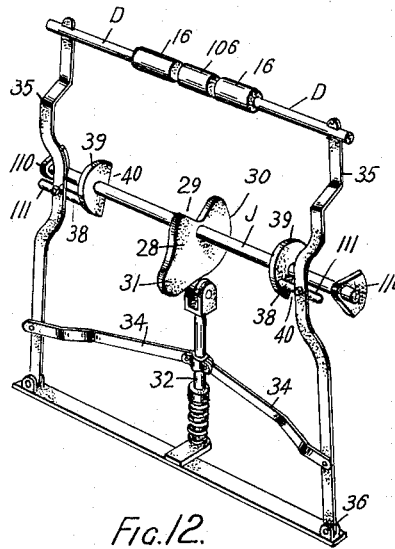
Fig.12.
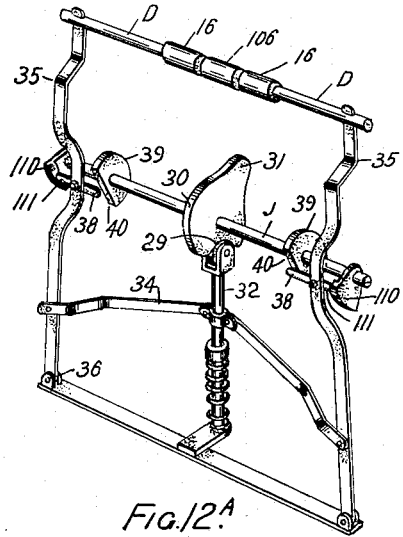
Fig.12.A May 29, 1934. F. R. STELLING 1,960,759
MACHINE FOR THE MANUFACTURE OF CHRISTMAS CRACKERS
Filed April 28, 1933  5 Sheets-Sheet 5
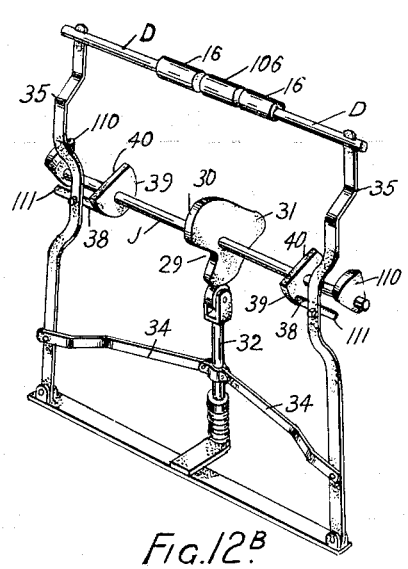
Fig.12.B
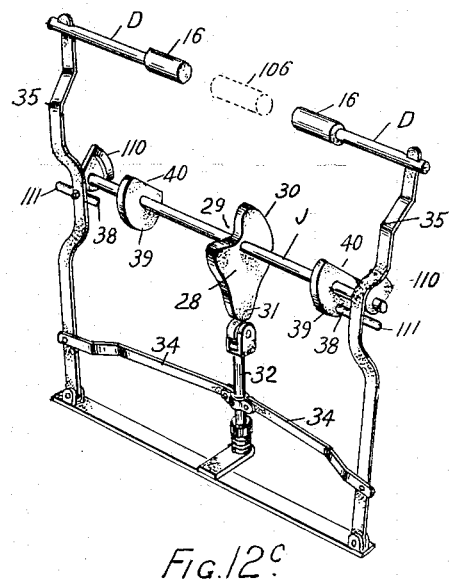
Fig.12.C
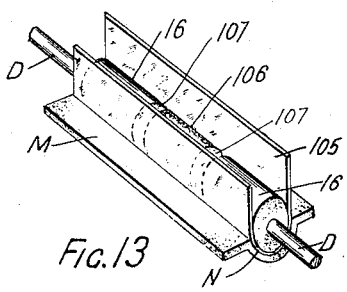
Fig.13
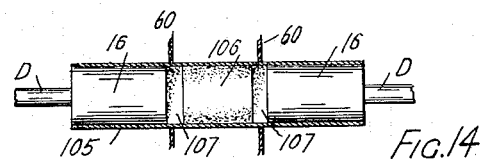
Fig.14
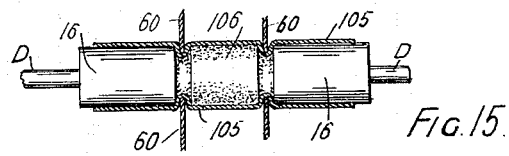
Fig.15
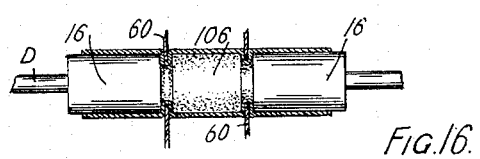
Fig.16
Inventor
Franz Riedl Stelling
By B. Singer, atty.

1,960,759

UNITED STATES PATENT OFFICE 1,960,759

MACHINE FOR THE MANUFACTURE OF CHRISTMAS CRACKERS

Franz Riedl Stelling, Roseville, near Sydney, New South Wales, Australia

Application April 28, 1933, Serial No. 668,448 In Australia May 2, 1932

16 Claims. (Cl. 93—5)

This invention relates to the manufacture of Christmas crackers (also known as "mottoes" or "bon-bons") which consist of a cylindrical paper sheath, containing trifles, and which are adapted to emit a crack when the ends are pulled apart. The invention has particular reference to the formation of the circumferential "crimps" or annular recess folds which are located at the ends of the central body portion and separate the latter from the end portions of the crackers.

The cracker is usually formed around a central paper cylindrical core which forms the "body" and in which the trifles, which the cracker contains, are located. A layer or layers of paper to form the sheath or cover (usually variously coloured) are rolled about the core, from which they are continued to form the end portions. The crimps are formed in the paper sheath adjacent the ends of the core, and serve to maintain the ends of the core closed (at least partially), and also to maintain the core in position.

As far as can be ascertained the formation of the crimps in crackers has hitherto been carried out by laborious and slow means, principally by hand. The object of this invention is to provide an improved machine for performing this operation expeditiously and efficiently.

In order to fully describe the invention reference is had to the accompanying drawings which depict a preferred embodiment thereof, and in which Fig. 1 is a general perspective view of the machine, Fig. 2 a front elevation thereof, partially in cross-section.

Fig. 3 a transverse cross-sectional elevation approximately on line 3—3 of Fig. 2, Figs. 4A, 4B, 4C and 4D are fragmentary diagrammatic views shewing the translational operation of the turrets, Fig. 5 an axial longitudinal cross-sectional plan through one of the diaphragm turrets.

Fig. 6 a transverse cross-sectional elevation of one of the diaphragm turrets, on line 6—6 of Fig. 5, Fig. 7 an axial longitudinal cross-sectional elevation through the diaphragm turret, at right angles to the view shewn in Fig. 5, Fig. 8 a transverse cross-sectional elevation through one of the turrets, on line 8—8 of Fig. 7.

Fig. 9 a side elevation of the ejector mechanism,

Fig. 10 a diagrammatic view of the ejector operating link-work,

Fig. 11 a longitudinal cross-sectional elevation of one of the mandrels,

Fig. 12 is a detail perspective of the mandrel and associated elements shewing the same in one position.

Fig. 12A is a similar view of the same in another position.

Fig. 12B is a similar view of the same in another position.

Fig. 12C is a similar view of the same in another position.

Figs. 13, 14, 15 and 16 are views of the cracker in the course of formation.

Such expressions as "inner", "outer", "upper", and "lower" and the like are with reference to the centre of the machine, unless the context indicates otherwise.

General

The framing of the machine is formed on legs A, A on which is a table-top B and bearing standards C, C for the mandrel shafts D, D. The framework supports two shelves E, E for the paper supply, and a rearwardly projecting conveyor F for the finished crackers.

Figure 1:
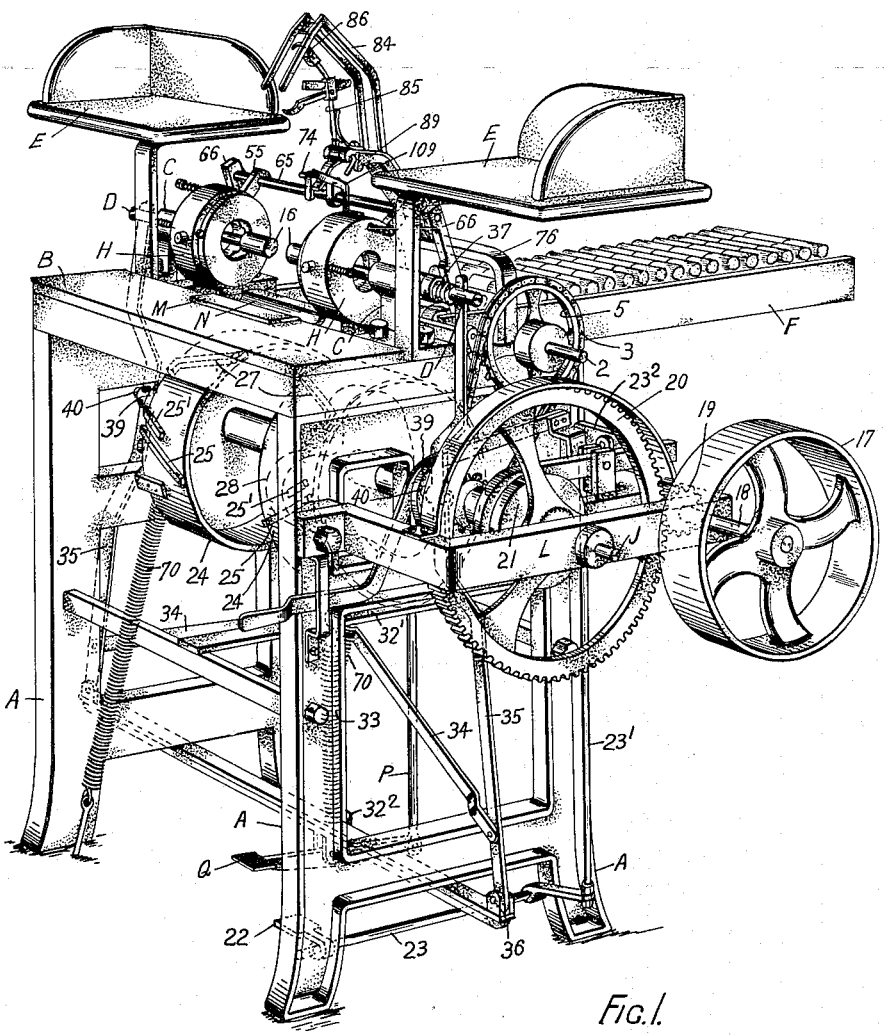

A longitudinal bed G (Figs. 2 and 3) supported in the framing forms a slide for the two diaphragm turrets designated generally by the characters H, H. The main drive shaft J of the machine is mounted longitudinally beneath the table-top B, and is supported in bearings K, K in the legs A and in extension bracket L secured to one of said legs A (Figs. 1 and 2).

The conveyor F is of any suitable known type, and the actuating shaft 2 thereof is driven from main shaft J by a chain 3 engaging a sprocket 4 (Fig. 2) on shaft J and a sprocket 5 on shaft 2.

The mandrel shafts D are axially slidable in the bearings C, and are disposed in mutual axial alignment longitudinally in the machine, the mandrel heads 16, 16 being mounted on the inner opposed ends of the shafts. As shewn in Fig. 11, each mandrel 16 and shaft D has an axial bore 77 therein, and in this bore is located a rod 78 actuating a cone valve 79 located on a countersunk seat 80 in the inner end of mandrel 16. Pivoted within a slot 81 in rod 78 is a latch 82 the heel of which projects through a slot 83 in shaft D and engages the inner face of bearing C, when the mandrel is in the forward position. The end of rod 78 within bore 77 is attached to a tension spring 84 secured to the end of bore 77, the spring tending to maintain valve 79 on its seat. As mandrel shaft D is withdrawn from the work to the centre of the machine, the engagement of the heel of latch 82 with bearing C and the nose of the latch with the rod 78 prevents the rod being withdrawn with the shaft D, thus causing valve 79 to lift off its seat 80. When shaft D has been withdrawn sufficiently far to cause the inner end of slot 83 to strike the latch 82, the heel of the latter is forced downwardly, thus positioning the latch wholly within slot 81 in rod 78, and allowing spring 84 to draw rod 78 fully into bore 77, and reseat valve 79. The purpose of this construction is hereinafter explained.

The diaphragm turrets H, H are arranged concentrically about the shafts D, D and are slidable axially with the said shafts, upon bed G, as hereinafter explained.

Seating on table B beneath shafts D is a platen M having a central semicircular dish N therein in longitudinal parallelism with the shafts D, and vertically below the same. The platen M is mounted for vertical reciprocation upon short shafts O (Fig. 3) which are reciprocated by a link P actuated by a foot pedal Q pivoted at $Q^1$ in the framing. Depression of pedal Q causes the platen M to rise vertically and engage the dish N about the mandrel heads 16 (see Fig. 13) when the latter are in the inner position.

The drive

As shewn in Figs. 1 and 2, a pulley 17, mounted on a shaft 18 suitably supported in the framing, is driven from a source of power. A pinion 19 on shaft 18 meshes with and drives a spur wheel 20 rotatably mounted on main shaft J. The spur 20 is connected to the main shaft J when required by a suitable pin clutch 21 of known throw-out type (Fig. 2). The clutch 21 is actuated from a pedal 22 oscillating a transverse shaft 23 mounted in legs A, A and in turn oscillating a vertical rod $23^1$ connected by a link $23^2$ to the clutch 21.

Secured upon shaft J between legs A, A are two similar and symmetrically spaced cam drums 24, 24, each of which carries an inclined cam track 25 and parallel auxiliary track $25^1$ adapted to engage with two spaced roller lugs $26^1$ and $26^2$ projecting downwardly through bed G from the associated diaphragm turret H, and to slide this turret inwardly upon the slide-bed G upon rotation of drum 24. On each drum 24 is a second (draw out) cam track 27, having a tail $27^1$, which is reversely disposed to track 25, and which is adapted to engage its associated lugs $26^1$ and $26^2$ and retract the turret from the centre of the machine. The tracks 27 are located approximately 270° behind tracks 25 (centre to centre) in the rotation of drums 24 (see arrow Fig. 3).

The precise operation of the cam tracks 25 and 27 in sliding the turrets H towards the centre of the machine and retracting the same respectively, is shewn diagrammatically in Figs. 4A, 4B, 4C and 4D. In Fig. 4A the turret H is in the fully inward position, and as cam drum 24 rotates in the direction of the arrow the nose of track 27 enters between lugs $26^1$ and $26^2$ and slides the turret outwardly from the centre of the machine until the fully retracted position of the turret is reached and the tail $27^1$ of the track leaves roller $26^1$ and frees the turret (Fig. 4B). In this position lug $26^1$ has moved outside the outer edge of drum 24.

As the drum continues to revolve in the direction the auxiliary track $25^1$ engages lug $26^2$ and commences to slide the drum inwardly towards the centre of the machine (see Fig. 4C) and when lug $26^2$ has been forced past the short track $25^1$, the lug $26^1$ has moved sufficiently inwards to be engaged by track 25, which continues to slide the turret inwards until the position of Fig. 4D is reached, wherein lug $26^1$ has left the inner end of track 25 and the turret is at the innermost position, as in Fig. 4A. This movement is repeated on the next revolution of drum 24.

Thus it will be seen that under the influence of tracks 25 the turrets H are slid towards one another and towards the centre of the machine, where they dwell for approximately 270° of the revolution of drums 24, and that after such dwell the turrets are engaged by tracks 27 and retracted from the centre of the machine, where they dwell for approximately 90° of the revolution of drums 24.

Figure 3:
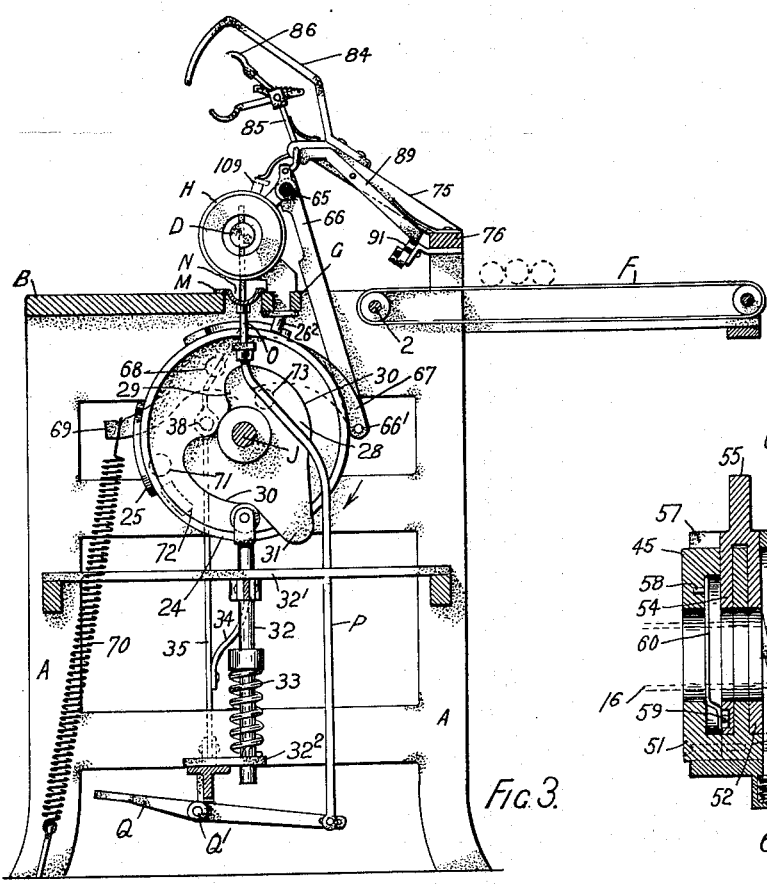
Figure 5:
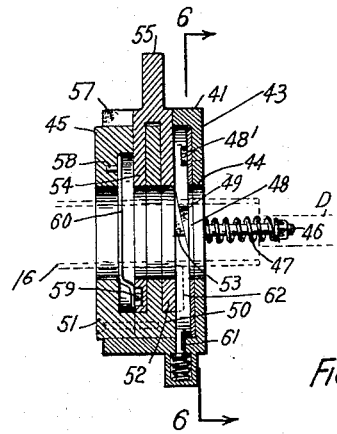

Located upon shaft J between drums 24, is the mandrel operating cam 28 having a dead section 29, a circular section 30 and a hump 31 (Figs. 3 and 12). As shewn in Figs. 2 and 3, this cam bears upon and, during its rotation, oscillates a vertically disposed rod 32 slidably mounted at $32^1$ and $32^2$ in the framing and normally urged upwardly by a spring 33. Rod 32 is connected by two links 34, 34 (Fig. 2) to a mandrel rocker 35 on either side of the machine, the lower ends of which rockers 35 are each pivotally mounted at 36 to the framing, and which engage at their upper ends in slots $35^1$ the respective mandrel shafts D, with the interposition of a compression spring 37 (Figs. 2 and 11). Thus it will be seen that downward movement of rod 32, under the influence of cam 28, will cause the rocker arms 35 to retract the mandrel shafts D from the centre of the machine and from each other, and that upward movement of rod 32 under the influence of spring 33 will cause the mandrel shafts D to be forced towards each other. Each of the rocker arms 35 is provided with a pin 38 on its inner side which bears against a dead plate 39 mounted on shaft J, each of which dead plates is gapped as at 40 (Fig. 12) for a certain portion of its periphery. The effect of the dead plates 39 is to prevent the rocker arms 35 (and the mandrel shafts D) from converging to their fullest extent until the gaps 40 in the dead plates are opposite pins 38 on the rocker arms. In order to ensure that rocker arms 35 will move inwardly to the fullest extent when so required, an impulse cam 110 is mounted on each end of shaft J adjacent a pin 111 on the outer edge of each rocker 35. The cams 110 are opposite the gaps 40 of the dead plates 39, and contact with the pins 111 and force the arms 35 inwardly at one point in the revolution of shaft J.

The diaphragm turrets

Figure 6:
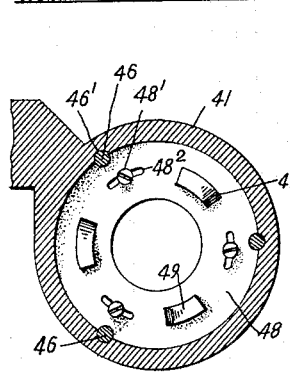
Figure 7:
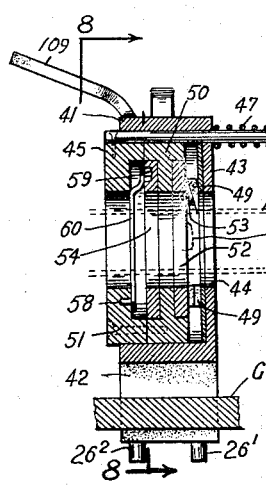
Figure 8:
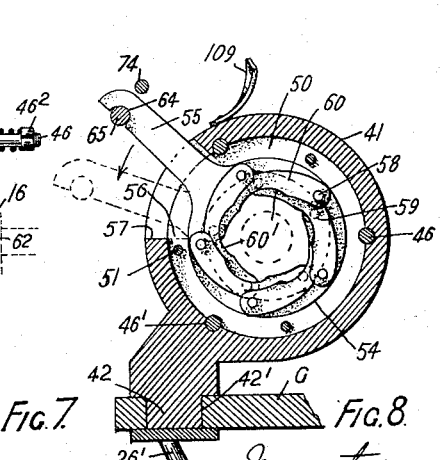

The opposed diaphragm turrets H being similar, one only will be described in detail. The construction (Figs. 5 to 8), comprises an outer cylinder casing 41 mounted on a base plate 42 projecting into and slidable in a longitudinal slot $42^1$ in bed G, and provided with the spaced downwardly projecting roller lugs $26^1$ and $26^2$ for engagement with the cam tracks 25 and 27. One end of the casing 41 is open, and the other end is closed by a back plate 43 which has an axial central bore 44 formed therethrough. Mounted in casing 41 is a hollow piston 45 which is slidable but not rotatable in casing 41, and projects from the open end thereof. Secured in piston 45 and located in apertures $46^1$ formed half in the casing 41 and half in the piston (see Fig. 6) are a plurality of guide rods 46, 46 which project from the back plate 43 of the casing, between which plate and nuts $46^2$ threaded the ends of rods 46 are compression springs 47, 47 which urge the piston 45 to the retracted position within casing 41. A disc 48 is adjustably secured to the inner face of back plate 43 by set screws 48¹, 48¹ passing through slots 48² in the plate, and mounted on this disc are a plurality of spaced sloping cams 49, 49.

To the skirt of piston 45, a T section annular ring 50 is secured by set screws 51, 51. Against that face of the web and flange of the ring 50 juxtaposed to back plate 43, a disc ring 52 is rotatably mounted, and on the face of this latter ring a plurality of cams 53, 53 are formed, which cams are complementary to the cams 49, and co-operate therewith. Against the opposite face of the web and flange of ring 50, a second disc ring 54 is rotatably mounted. The two rotatable disc rings 52 and 54 are joined by a common operating handle 55, segmental clearance for the handle being cut from the flange of ring 50 as at 56 (Fig. 8), and clearance in the casing 41 is cut in the form of a segmental aperture 57. Thus the two disc rings 52 and 54 may be oscillated in the seat in ring 50 by means of the handle 55.

A plurality of curved overlapping diaphragm leaves 60, 60 are pivoted at one end by pins 58 (Figs. 5 and 7) to the piston 45, and at the other end engage respectively in substantially radial slots 59 in ring 54, thus forming an iris diaphragm. The central portions of these leaves are curved as at 60¹ to form an approximately round aperture through the diaphragm. Since the leaves 60 are pivoted at one end to the non-rotatable piston 45, and at the other end engage slots 59 of the oscillatable ring 54, it will be seen that movement of handle 55, in the direction of the arrow in Fig. 8, will cause each leaf 60 to be swung towards the centre of the aperture about its pivotal point 58. Such contractive movement of the leaves 60 causes a constriction of the aperture through the diaphragm, whilst movement of handle 55 in the opposite direction will cause an expansion of the aperture. Ring 52 rotates simultaneously with ring 54, and the movement of handle 55 to cause a contraction of the diaphragm leaves also causes cams 53 to ride up on cams 49, and so force the piston 45 outwardly from casing 41, against the pressure of springs 47. Reverse movement of handle 55 causes the diaphragm aperture to expand and clears cams 53 from cams 49 for retraction of the piston into the casing. When piston 45 has moved to the outermost position in casing 41 upon constriction of the diaphragm aperture, a spring loaded catch pin 61 (Fig. 5) mounted in the casing, engages behind the piston, and prevents it from being retracted into the casing 41 as cams 53 are cleared from cams 49 and the diaphragm aperture is expanded. When the diaphragm has reached almost full expansion, a cam 62 on ring 52 (Fig. 5) forces the pin 61 outwardly and clears the pin from behind the piston during final rotation of this ring, and permits the piston to snap back into the casing under the influence of springs 47. It is to be noted that during constriction of the diaphragm aperture the piston 45 (carrying the leaves 60) moves outwardly from casing 41 under the influence of the cams 49 and 53, but that during the major portion of expansion of the diaphragm aperture the piston is stationary in the casing owing to its engagement by catch pin 61, and that when full expansion of the aperture is reached, the piston snaps back into the casing.

The axial bore 44 is continued clear through the diaphragm turret, for the reception of a cracker and for the passage therethrough of mandrel shafts D and mandrels 16.

Diaphragm operating levers 55 are each provided with downwardly directed recess 64 which engages a horizontal bar 65 carried at either end in two upwardly directed risers 66 (Figs. 2 and 3). Each riser 66 is mounted and actuated in a similar manner, so that one only is described in detail. The lower end of riser 66 is pivoted at 66¹ to the free end of a horn 67 itself pivoted at 68 to the framing (Figs. 2 and 3), and having an extension 69 secured to a tension spring 70 attached at the other end to the floor. Upon the outer side of the adjacent cam drum 24 is a roller 71 and a continuation plate 72 adapted to contact during rotation of the drum with the upper face of the horn 67, and so force the free end thereof downwardly against the tension of spring 70. The downward movement of the free end of horns 67 causes a similar downward movement of the risers 66, and hence of the bar 65.

After the continuation plate 72 has left the free end of the horn during rotation of drum 24, a kick roller 73 on the side of drum 24 contacts with the underside of the horn and gives the free end thereof a positive upward impulse, thus causing the risers 66, and bar 65, to move upwardly, where they are held by springs 70.

Located centrally on bar 65 are two stud pins 74, 74 (Fig. 2) in parallelism with the bar but spaced above the same. These pins engage over the diaphragm levers 55 when the turrets H are slid inwardly on the bed G to the operative position, and cause the levers to be drawn downwardly to contract the diaphragms, as the bar 65 falls. The rising of bar 65 causes the diaphragms to expand, as previously explained.

*The ejector*

The ejector mechanism, shewn clearly in Fig. 9, comprises a standard 75, secured to an extension 76 of the framing, and projecting forwardly towards the shafts D. Secured to the standard 75 are two spaced guard arms 84, 84. A main ejector arm 85, having a forked jaw 86 secured to its outer end, is mounted upon a shaft 87 pivotally mounted in the forward end of standard 75. Shaft 87 is extended into a crank 88 adapted to be engaged by the upper end of a rocker 89 pivoted at 90 to the standard 75. The lower end of rocker 89 is engaged by a bell crank lever 91 (see also Fig. 10) pivoted to a bracket 92 on frame extension 76, which is adapted to oscillate the rocker 89 about its pivotal point. The bell crank lever 91, as shewn diagrammatically in Fig. 10, is oscillated by a link 93 and a rocker 94 pivoted at 95 to the framing and contacting with the side of cam drum 24 and adapted to ride upon a cam 96 thereon. This arrangement can also be seen partially in Fig. 2. A leaf spring 97, secured on extension 76, bears upon the lower end of rocker 89, and the rocker 94 is maintained in contact with the drum 24 by means of a tension spring 98 secured to this rocker and to the framing.

Whilst, during the major portion of the rotation of drum 24, the rocker 94 is in contact with the drum, bell crank 91 is in the position shewn in full lines in Fig. 10. In this position the lower end of rocker 89 is thrust forwardly by spring 97, and the upper end of this rocker clears crank 88, thus freeing ejector arm 85 (dotted lines Fig. 9) and permitting same to fall. When, after an operation, it is desired to raise ejector arm 85, cam 96 on drum 24 moves under rocker arm 94, oscillating bell crank 91 to the position shewn dotted in Fig. 10, and forcing the lower end of rocker 89 backwardly. This movement causes the upper end of rocker 89 to contact with crank 88 and force same downwardly, to raise the ejector arm 85 (full lines Fig. 9).

Pivotally mounted at 99 to main ejector arm 85 is an auxiliary arm 100 having at one end a jaw 101 adapted to co-operate with jaw 86 of the main arm. An over-centre spring 102 connects the free end of arm 100 to arm 85 and tends to retain the jaws in either the open or closed position. A stop 103 secured to the outer end of standard 75 is adapted to strike the free end of arm 100, and so open the jaws, when the ejector arms fall to the lowermost position $100^2$ (as shewn dotted in Fig. 9). The over-centre spring 102 maintains the jaws open whilst the arms are being raised, but to ensure that the effect of this spring is not overcome by the rapidity of the raising movement and the sudden stop at the top of this movement, a spring stop 104 is secured to standard 75 and contacts with the free end of arm 100 at the top of its upward movement and so snaps open the jaws should they be closed.

The operation

For clarity of description the drawings do not show the machine at the commencement of the operation, but in the position after a cracker sheath has been crimped and the turrets H are partially withdrawn.

At the commencement of the operation the mandrels 16 are at the forward position (as in Figs. 2 and 12). In this position, as depicted in Fig. 12, the hump 31 of cam 28 has just left rod 32, and pins 38 on rockers 35 are bearing against the operative surfaces of dead plates 39. The cams and dead plates are considered (diagrammatically) as revolving in unison (on shaft J) in the directions of the arrows shewn in Fig. 12. The ejector 85 is in the raised position (the rocker arm 94 being on cam 96), and the diaphragm turrets H are retracted. The sheets of paper 105 necessary for the formation of the sheath of the crackers are laid upon platen M (Fig. 13) which is raised by pedal Q to cause the paper in the dish N to contact with and curl about the underface of the mandrels 16. The mandrels 16 are in this position mutually spaced sufficiently to permit the paper body cylinder 106 of the cracker to be placed between the mandrels with an equal clearance space 107 at each end. The paper sheets 105 are then completely manually curled around the mandrels 16 and the cylinder 106, and are secured by adhesive, forming the sheath. The partially formed cracker is then ready for crimping of the sheath, which takes place in the spaces 107. The platen M is allowed to drop on to table B, clearing the turrets H.

The foot pedal 22 is then depressed to engage clutch 21 and so put shaft J into rotation. Cam 96 on drum 24 then moves from under rocker arm 94, freeing crank 88 and allowing the ejector arms 85 and 100 to fall. In this fall jaw 86 contacts with the cracker sheath (as shewn at $86^1$ Fig. 9) whilst jaw 101 (in the open position) just clears the same.

The diaphragm turrets H are then moved inwardly by the cam tracks 25 and $25^1$ on drums 24, and take up a position wherein the diaphragm leaves 60 are just clear transversely (Fig. 14) of the inner ends of mandrels 16, and handles 55 are engaged under pins 74 of bar 65. Rollers 71 then contact with horns 67, and bar 65 drops, causing the diaphragm leaves 60 to contract and move inwardly slightly towards the centre of the machine. The contraction of the diaphragms causes the leaves 60 to be forced into the spaces 107 between the mandrels and the cylinder 106, thus crimping the paper sheath 105 into these spaces, as shewn in Fig. 15. The slight inward movement of the diaphragm leaves 60 during the crimping prevents the tearing of the paper, which also moves inwardly during such crimping. During inward movement of diaphragm turrets H, a short inclined lever 109, attached to the casing 41 of one of such turrets, contacts with the free end of ejector arm 100, which is as yet in the open position. Contact by lever 109 moves the arm 100 to the closed position shewn at $100^1$ in Fig. 9 wherein the jaw thereof co-operates with jaw $86^1$ in gripping the cracker, as shewn at $101^1$. The overcentre spring 102 retains the jaws in this closed position.

The main shaft J has at this point revolved sufficiently to bring gaps 40 in dead plates 39 opposite pins 38 on rocker arms 35, and dead section 29 of cam 28 opposite rod 32, as shewn in Fig. 12A, thus allowing mandrels 16 to converge slightly more, as shewn in Fig. 16, and causing impulse cams 110 to contact with pins 111 on levers 35, thus positively pressing the outside of the crimp in the paper 105 against the closed diaphragm by means of mandrels 16, thereby compacting the crimp and rendering same permanent (Fig. 16). The springs 37 on mandrel shafts D prevent injury to the diaphragms and permit rockers 35 to slide in slots $35^1$ in mandrel shafts D. The round portion 30 of cam 28 then engages rod 32 and retracts the mandrels 16 slightly (Fig. 12B), freeing the diaphragms from pressure of the mandrels 16.

The rollers 73 on drums 24 then engage under horns 67 and flick same upwardly, raising bar 65 and hence diaphragm levers 55 (see Fig. 3). The diaphragm apertures are thereby expanded, but pistons 45 carrying the diaphragms do not retract owing to the engagement of catch pins 61 behind the pistons. This expansion of the diaphragms without translational movement allows the leaves 60 to vacate the now narrowed crimps without disturbing or loosening the same. When the diaphragms are fully expanded and clear of the sheath 105, catch pins 61 are freed and the diaphragm pistons 45 snap back into the casings 41 under the influence of springs 47. The pull out cam tracks 27 then engage between lugs $26^1$ and $26^2$ of the diaphragm turrets H, and retract the same. This is the position shewn in Figs. 1, 2 and 3 of the drawings.

The hump 31 on cam 28 then forces rod 32 downwardly (Fig. 12C) thus retracting the mandrels 16 fully and releasing the cracker. During the retraction of the mandrels 16, the valves 79 and their rods 78 (Fig. 11) remain in the forward position as the mandrels are retracted, until the ends of slots 83 force latches 82 downwardly, when the valves and rods snap backwardly into the mandrels 16 and shafts D. The effect of this retarded withdrawal of valves 79 is to break the vacuum which would otherwise exist in the open ends of the sheath upon rapid withdrawal of solid mandrels. Such a vacuum would cause a distortion of the crimps and the collapse of the sheath ends.

The ejector arms 85 and 100 holding the cracker then fall by gravity to the lowermost position, and during such fall the free end of ejector arm 100 is struck by stop 103 and forced to the open position ($100^2$, Fig. 9) releasing the cracker, (105¹, Fig. 9) which then passes from the machine on to conveyor F.

The hump 31 of cam 28 then clears rod 32 and the mandrels 16 return to the starting position (Fig. 12). The rocker 94 rides upon cam 96 and the bell crank lever 91 returns to the original position, raising the ejector to the position shewn in Fig. 1, and full lines Fig. 9.

The clutch is then freed, and the machine stops in readiness for the formation of the next cracker.

I claim:

1. A machine for the manufacture of crackers, comprising a framing, mounted in said framing two axially aligned and axially reciprocable mandrels to support the sheath of a cracker, a turret slidably mounted in said framing in axial alignment with the mandrels, an axial bore in said turret for the reception of a sheath on said mandrels, mounted transversely in said turret and about said bore a plurality of pivoted leaves forming a contractable iris diaphragm, and means for oscillating said leaves to cause a contraction or expansion of the diaphragm for the purpose of forming a circumferential crimp in a sheath encircled by said diaphragm.

2. A machine for the manufacture of crackers, comprising a framing, two opposed mandrels reciprocally mounted in axial alignment in said framing to form the support of the sheath of a cracker, two opposed turrets mounted in the framing for reciprocation axially about said mandrels and each having an axial bore therein, each of said turrets containing about said bore an iris diaphragm crimping device to operate upon a sheath mounted on said mandrels, said crimping device comprising a plurality of leaves disposed transversely of the turret and each pivoted at one end in the turret and at the other end engaged in an oscillatable ring transversely mounted in the turret, means for moving each unit of the mandrels and of the turrets towards the other and for retracting the same, and means for oscillating said rings to cause a contraction of the leaves upon the sheath supported on said mandrels for the purpose of effecting two circumferential crimps in said sheath.

3. A machine for the manufacture of crackers comprising a framing, two opposed mandrels reciprocally mounted in axial alignment in said framing and forming a support for the sheath of a cracker, cam means for reciprocating said mandrels towards and from each other, two opposed turrets mounted in said framing for reciprocation in axial alignment with said mandrels, in each turret an axial bore for the passage of a mandrel, cam means for reciprocating said turrets towards and from each other, in each turret about said bore an iris diaphragm crimping device comprising a plurality of overlapping leaves transversely disposed in the turret and each pivoted at one end to the turret and at the other end engaged in a ring transversely and oscillatably mounted in said turret, and cam means for simultaneously oscillating said rings to cause a contraction of the leaves upon the sheath supported on said mandrels and a subsequent expansion of said leaves, to effect two circumferential crimps in the sheath.

4. A machine for the manufacture of crackers comprising a framing, two similar opposed turrets mounted for reciprocation in axial alignment in said framing, in each turret an axial bore and an iris diaphragm composed of a plurality of overlapping leaves disposed transversely about said bore and each pivoted at one end to the turret and at the other end secured in a ring oscillatably mounted transversely in said turret about said bore, two opposed mandrels carried on shafts reciprocally mounted in alignment in said framing and adapted to pass axially through the said turret bores respectively, an actuating shaft mounted in said framing and rotated from a source of power, a cam associated with said actuating shaft for causing equivalent movement of said mandrels respectively towards and from each other, cams associated with said actuating shaft for causing equivalent movement of the turrets respectively towards and from each other, and means associated with said actuating shaft which, upon rotation of this shaft, cause oscillation of the rings in said turrets to effect a contraction of the diaphragms upon the sheath of a cracker supported on said mandrels and a subsequent expansion of the diaphragms to release the leaves from the said sheath.

5. A machine according to claim 4, and including cam means associated with said actuating shaft for effecting an impulse of said mandrels towards each other when the diaphragms are contracted on the sheath.

6. A machine for the manufacture of crackers, comprising a framing, mounted in said framing two axially aligned and axially reciprocable mandrels to support the sheath of a cracker, a turret slidably mounted in said framing in axial alignment with the mandrels, an axial bore in said turret for the reception of a sheath on said mandrels, mounted transversely in said turret and about said bore a plurality of pivoted leaves forming a contractable iris diaphragm, means for oscillating said leaves to cause a contraction or expansion of the diaphragm for the purpose of forming a circumferential crimp in a sheath encircled by said diaphragm, and means for effecting an impulse of said mandrels towards each other when the diaphragms are contracted on the sheath.

7. A machine according to claim 4, and including means associated with said mandrels to admit air and thus prevent the formation of a vacuum in the ends of the sheath upon the withdrawal of the mandrels from such ends.

8. A machine for the manufacture of crackers, comprising a framing, mounted in said framing two axially aligned and axially reciprocable supporting mandrels to engage in the open ends respectively of the sheath of a cracker, a turret slidably mounted in said framing in axial alignment with said mandrels, an axial bore in said turret for the reception of the sheath on said mandrels, mounted transversely in said turret and about said bore a plurality of pivoted leaves forming a contractable iris diaphragm, means for oscillating said leaves to cause a contraction or expansion of the diaphragm for the purpose of forming a circumferential crimp in the sheath encircled by said diaphragm, and means associated with said mandrels for admitting air and thus preventing the formation of a vacuum in the ends of the sheath as the mandrels are withdrawn from the sheath.

9. A machine according to claim 8, in which each mandrel is supported upon the end of a shaft and in which the means for preventing the formation of a vacuum comprise an axial bore through said mandrel and in said shaft, a valve head seating in the free end of said mandrel and carried on a rod reciprocable in said bore, and means for temporarily preventing retraction of the valve and rod during the early stage of the retraction of the mandrel, and for causing retraction of the valve and rod after the mandrel has been partially retracted.

10. A machine according to claim 1, including an ejector for the purpose of removing a finished cracker from the mandrels after the latter have been retracted, comprising a main arm pivotally mounted in the framing and having a jaw to fall upon and engage a cracker supported on the mandrels, an auxiliary arm pivoted on the main arm and coupled thereto by an overcentre spring, a jaw on the auxiliary arm which clears the cracker during the fall of the main arm thereonto and which co-operates with the jaw of the main arm, means for moving the auxiliary arm into contact with the cracker engaged by the main arm, where it is held by the overcentre spring, and means for opening the jaws of the ejector as the arms gripping the cracker swing downwardly after the mandrels have been withdrawn from the cracker.

11. A machine for the manufacture of crackers, comprising a framing, means mounted in said framing for supporting the sheath of a partially formed cracker, a crimping device mounted in a turret slidable in the framing in axial alignment with the sheath supported therein and having an axial bore to receive said sheath, a contractable diaphragm transversely mounted in said turret about the bore thereof and comprising a plurality of leaves each pivoted at one end therein and at the other end engaging a member transversely and oscillatably mounted in said turret, and means for oscillating said member to cause a contraction and expansion of the diaphragm, the diaphragm leaves being mounted upon an element slidable in the turret, and means for causing sliding movement of the said element in the turret during contraction of the diaphragm.

12. A machine for the manufacture of crackers, comprising a framing, means mounted in said framing for supporting the sheath of a partially formed cracker, a crimping device mounted in a turret slidable in the framing in axial alignment with the sheath supported therein and having an axial bore to receive said sheath, a contractable diaphragm transversely mounted in said turret about the bore thereof and comprising a plurality of leaves each pivoted at one end therein and at the other end engaging a member transversely and oscillatably mounted in said turret, and means for oscillating said member to cause a contraction and expansion of the diaphragm, the said turret comprising a cylindrical casing, and a piston slidable but not rotatable in said casing, and in which the plurality of overlapping leaves forming the diaphragm are disposed transversely about the bore through said turret, and are each pivoted at one end to said piston and at the other end engage a ring oscillatably mounted on said piston, and including means for sliding said piston axially in the casing during oscillation of said ring in the direction to cause contraction of the diaphragm leaves.

13. A machine according to claim 1, in which the bored turret comprises a cylindrical casing open at one end, an axially bored piston slidable and non-rotatable in said casing, spring means to retract said piston into said casing, and in which the diaphragm leaves are pivoted at one end in the piston and the means for oscillating the leaves comprises a ring oscillatably mounted on said piston transversely about the bore therein and engaged by the ends of the diaphragm leaves, and including a cam ring mounted on said piston adjacent the closed end of said casing and attached to the said diaphragm ring to oscillate therewith, and cams in the closed end of said casing to co-operate with cams on the cam ring in forcing the piston and diaphragm axially towards the open end of the casing against the pressure of said spring means when said rings are oscillated in the direction to cause contraction of the diaphragm leaves.

14. A machine for the manufacture of crackers, comprising a framing, means mounted in said framing for supporting the sheath of a partially formed cracker, a crimping device mounted in a turret slidable in the framing in axial alignment with the sheath supported therein and having an axial bore to receive said sheath, a contractable diaphragm transversely mounted in said turret about the bore thereof and comprising a plurality of leaves each pivoted at one end therein and at the other end engaging a member transversely and oscillatably mounted in said turret, and means for oscillating said member to cause a contraction and expansion of the diaphragm, the diaphragm leaves being mounted on a bored element slidable axially in the turret, means for causing a sliding movement of the said element in the turret simultaneously with a contraction of the diaphragm leaves, means for preventing sliding movement of the said element in the turret during the expansion of the diaphragm leaves, and means for causing a reverse sliding movement of the element in the turret when the diaphragm leaves have been expanded.

15. A machine according to claim 1, in which the turret comprises a bored cylindrical casing open at one end, a piston axially slidable and non-rotatable in said casing and with an axial bore therein, spring means to retract said piston into said casing, and in which the diaphragm leaves are pivoted at one end to the piston and the means for oscillating the diaphragm leaves comprises a ring oscillatably mounted on said piston transversely about the bore therein and engaged by the ends of the diaphragm leaves, and including a cam ring mounted on said piston adjacent the closed end of said casing and attached to the said diaphragm ring to oscillate therewith, and cams in the closed end of said casing to co-operate with cams on the cam ring in forcing the piston axially and forwardly towards the open end of the casing against the pressure of said spring means when said rings are oscillated in the direction to cause contraction of the diaphragm leaves, a detent catch to hold the piston in the forward position whilst the rings are oscillated, and means to free the catch from the piston and allow the latter to be retracted into the casing by the spring means when the diaphragm has been expanded.

16. A machine for the manufacture of crackers comprising a framing, two opposed similar mandrels mounted upon shafts reciprocally mounted in axial alignment in said framing and forming a retractable support for the sheath of a cracker, cam means for equivalently reciprocating said mandrel shafts towards and from each other, two similar opposed bored cylindrical turret casings open at one end and mounted in said framing for reciprocating in axial alignment with said mandrels, in each of said turret casings a piston axially slidable in said casing and axially bored for the passage therethrough of a mandrel, spring means to retract said piston into said casing, mounted transversely on said piston about the bore therein a transverse iris diaphragm crimping device comprising a plurality of curved overlapping leaves each pivoted at one end in the piston and at the other end engaging a ring oscillatably mounted on said piston transversely about said bore therein for the purpose of expanding and constricting said diaphragm, a cam ring oscillatably mounted on said piston adjacent the closed end of said casing and attached to said diaphragm ring to oscillate therewith, cams in the closed end of said casing to co-operate with cams on the cam ring in forcing said piston forwardly towards the open end of the casing when said rings are oscillated in the direction to cause constriction of the diaphragm, a detent catch to hold said piston in the forward position whilst the rings are oscillated, means to free the said detent catch from the piston and permit the latter to be retracted into the casing by the spring means when the diaphragm has been expanded, cam means for equivalently reciprocating said turrets towards and from each other, cam means for simultaneously oscillating said diaphragm rings to cause a constriction of the diaphragm upon the sheath supported on the mandrels and a subsequent expansion of said leaves, cam means associated with said mandrel shafts for imparting an impulse of the mandrels towards each other when said diaphragms are constricted on the sheath, and means for admitting air through said mandrels to the interior of the sheath whilst the mandrels are being withdrawn from said sheath.

FRANZ RIEDL STELLING.